H. M. SHANNON.
EMERGENCY TIRE.
APPLICATION FILED AUG. 5, 1919.
1,341,345. Patented May 25, 1920.
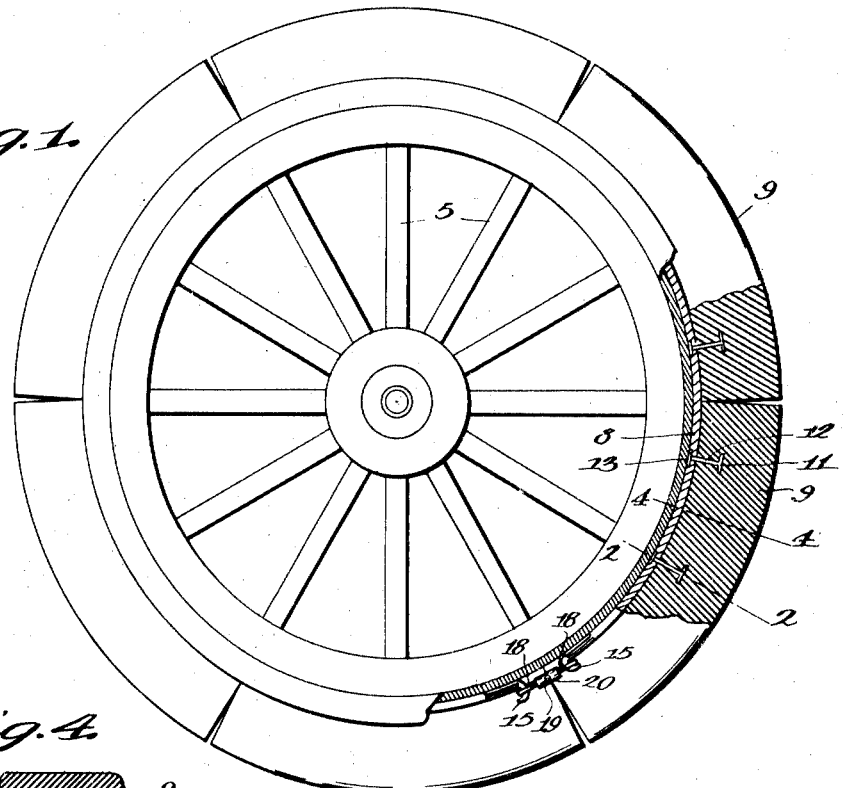
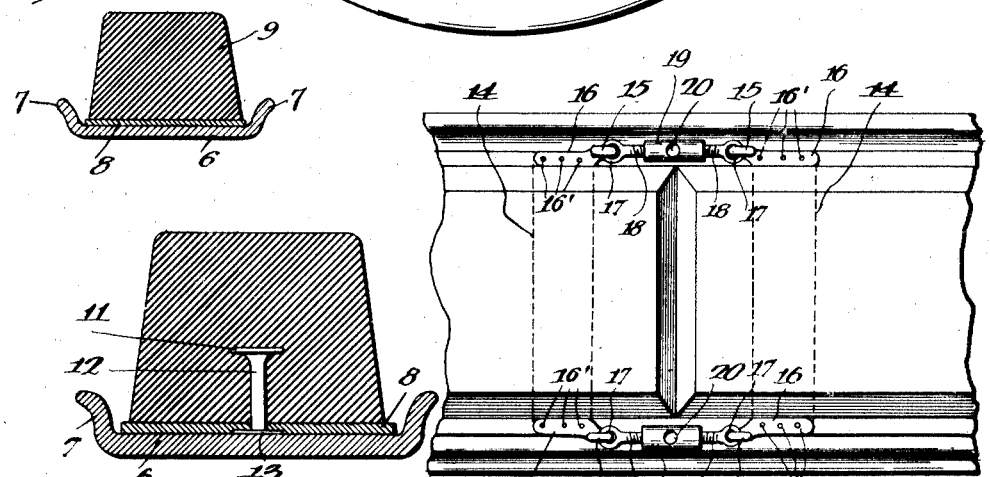
H. M. Shannon INVENTORS.

UNITED STATES PATENT OFFICE.

HARRIS MOORE SHANNON, OF RICHMOND, TEXAS, ASSIGNOR OF ONE-HALF TO OTTO NENTWIG, OF RICHMOND, TEXAS.

EMERGENCY-TIRE.

1,341,345.        Specification of Letters Patent.        Patented May 25, 1920.

Application filed August 5, 1919. Serial No. 315,526.

*To all whom it may concern:*

Be it known that I, HARRIS MOORE SHANNON, a citizen of the United States, and a resident of Richmond, in the county of Fort Bend and State of Texas, have invented certain new and useful Improvements in Emergency-Tires, of which the following is a specification.

My invention relates to improvements in emergency tires.

An important object of my invention is to provide an improved emergency tire adapted to be quickly and easily applied to the auto rim in the emergency arising by reason of the regular tire being incapacitated by a "blow-out" or other cause.

Another important object is to provide an improved emergency tire having high cushioning properties to the end of closely approximating the easy riding and other desirable qualities of the pneumatic tire; the construction and arrangement being such that the device may be cheaply and easily manufactured while preserving strength and durability.

Other objects and advantages reside in certain novel features of the construction, arrangement and combinations of parts and will become apparent as the description proceeds, reference being had to the accompanying drawings forming part of this specification and in which:

Figure 1 represents an elevational view of the device applied to the autowheel, parts being broken away for the sake of illustration, Fig. 2 is a sectional view through the line 2—2 of Fig. 1 illustrating the preferred means for fastening the cushioning segments to the flexible band, Fig. 3 is a plan view illustrating the fastening means for securing the device on the rim, Fig. 4 is a sectional view through line 4—4 of Fig. 1.

Referring to the drawings particularly to Fig. 1 the numeral 5 indicates an auto wheel of any conventional construction. This auto wheel is provided with the usual rim 6 which may be of any suitable type, but which is preferably of the type provided with circumferential flanges as at 7 between which is defined the usual channel. The usual conventional tire is normally seated in said channel and retained therein by the action of the flanges but when this tire has been incapacitated by reason of a blow-out or other cause it is removed and replaced by the improved emergency tire to be hereinafter more fully described.

The improved emergency tire comprises a flexible band 8 of any suitable nonmetallic fabric, such as canvas. Cushioning segments 9 formed of rubber or of any suitable nonmetallic cushioning material are secured to the flexible band 8. These segments are preferably secured by means of fasteners, each of which comprises a head 11 and shank 12 embedded in the inner portion of the cushioning segment 9, the shank 12 extending from the inner side of the segment 9 and through the flexible band 8 and is burred over or otherwise acted on to provide a head 13. The head 13 is counter-sunk in the inner side of the band 8 and if desired may be made detachable.

The flexible band 8 is of such length as to extend entirely around the wheel but a certain range of adjustment is provided by the adjustable fastening means to be hereinafter more fully described. The cushioning segments 9 are preferably six in number and their adjacent ends contact at the inner portions only, the major portions of said adjacent ends being spaced sufficiently to allow maximum cushioning action of the segments as shown in Figs. 1 and 3.

The adjacent ends of the flexible band 8 are provided with suitable reinforcing elements 14 preferably in the form of transverse nonmetallic strips as shown in dotted lines in Fig. 3, and with these reinforced portions of the band the adjustable fastening means coöperate. The adjustable fastening means preferably consists of hooks 15 having integral therewith flattened shanks 16 secured to the reinforced portions of the band by means of rivets or the like 16'. Eyelets 17 are engaged over the hooks 16 and these eyelets have integrally formed therewith threaded shanks 18. The shanks on one end of the band are oppositely threaded from those on the other end and coöperating with these threaded shanks are internally threaded sleeves 19, the opposite ends of each sleeve being oppositely threaded to correspond with the threads of the shanks with which they are engaged. These sleeves 19 are provided in their central portion with apertures 20 which extends entirely therethrough and which allow for the insertion of an operating tool by means of which the fastening means may be adjusted to loosen or tighten the flexible band on the rim as desired.

When the emergency tire is applied to the rim the flexible band is seated in the channel and by virtue of its flexible properties it conforms readily to the contour thereof. Moreover a certain range of adjustment is provided by the adjustable fastening means and although the emergency tire is made of a size corresponding to the standard wheel slight deviations from this standard size of wheel may be compensated for in this manner. It is obvious that the metallic elements have been reduced to a minimum and those few present are so arranged as to be out of the field of the cushioning action. In this manner the undesirable weight below the vehicle springs is reduced to a minimum and the wear and tear of the cushioning element which would result from metallic contact rubbing and pressure is precluded.

It is also apparent that the cushioning segments being spaced from each other and slightly spaced from the rim flanges have a nonrestricted field in which to perform their cushioning functions.

I claim:

1. An improved emergency tire comprising a flexible nonmetallic band of textile fabric adapted to be seated in the rim channel to conform to the contour of the rim portion against which it seats, cushioning nonmetallic segments secured to said flexible band, reinforcing nonmetallic strips secured to the ends of said band and extending transversely thereof and adjustable fastening means coöperating with the reinforced portions of said band and spaced from said cushioning blocks as and for the purposes set forth.

2. An improved emergency tire comprising a flexible non-metallic band of woven fabric adapted to be seated in the rim channel to conform to the contour of the rim portion against which it seats, cushioning non-metallic segments secured to said flexible non-metallic band, and adjustable fastening means spaced from the cushioning segments and secured to the meeting ends of the band, all as and for the purposes set forth.

HARRIS MOORE SHANNON.